United States Patent
Winkel

(10) Patent No.: US 9,394,116 B2
(45) Date of Patent: Jul. 19, 2016

(54) DEVICE FOR MONITORING THE EMPTY CONDITION OF A CONTAINER CELL OF A CONTAINER CLEANING MACHINE

(71) Applicant: KRONES AG, Neutraubling (DE)

(72) Inventor: Matthias Winkel, Flensburg (DE)

(73) Assignee: KRONES AG (DE)

( * ) Notice: Subject to any disclaimer, the term of this patent is extended or adjusted under 35 U.S.C. 154(b) by 97 days.

(21) Appl. No.: 14/320,094

(22) Filed: Jun. 30, 2014

(65) Prior Publication Data
US 2015/0008164 A1 Jan. 8, 2015

(30) Foreign Application Priority Data
Jul. 2, 2013 (DE) .......................... 10 2013 106 935

(51) Int. Cl.
B65G 43/06 (2006.01)
B65G 47/42 (2006.01)
B08B 9/20 (2006.01)
B08B 9/42 (2006.01)

(52) U.S. Cl.
CPC . *B65G 47/42* (2013.01); *B08B 9/20* (2013.01); *B08B 9/423* (2013.01); *B65G 43/06* (2013.01); *B65G 2201/0244* (2013.01)

(58) Field of Classification Search
CPC ............ B08B 9/20; B08B 9/205; B08B 9/30; B08B 9/32; B08B 9/42; B08B 9/423; B65G 43/06; B65G 47/42; B65G 2201/0244
USPC ....................................... 198/502.1
See application file for complete search history.

(56) References Cited

U.S. PATENT DOCUMENTS

| 2,249,614 | A | * | 7/1941 | Ladewig | B08B 9/42 134/126 |
| 2,617,435 | A | * | 11/1952 | Kessler | B08B 9/30 134/103.2 |
| 3,433,966 | A | * | 3/1969 | Letch | B65G 43/08 198/395 |
| 4,165,756 | A | | 8/1979 | Sirch et al. | |
| 5,135,014 | A | * | 8/1992 | Beswick | B08B 9/423 134/126 |
| 2012/0110952 | A1 | * | 5/2012 | Zardini | B08B 3/022 53/425 |

FOREIGN PATENT DOCUMENTS

| DE | 21 13 949 | 10/1972 |
| DE | 2735532 | 2/1979 |
| DE | 33 14 627 A1 | 10/1984 |
| DE | 37 25 953 A1 | 2/1989 |
| DE | 195 24 350 | 1/1997 |

OTHER PUBLICATIONS

Extended European Search Report in EP application EP 14 175 355.8 dated Oct. 1, 2014.

* cited by examiner

*Primary Examiner* — Mark A Deuble
(74) *Attorney, Agent, or Firm* — Haynes and Boone, LLP

(57) ABSTRACT

A device for monitoring the empty condition of a container cell of a container cleaning machine, preferably a container cleaning machine for cleaning returnable bottles in a beverage filling plant, comprising at least one foreign body ejection device for ejecting a foreign body that is present in a container cell from said container cell, wherein a checking device for checking the integrity of the container cell is provided.

19 Claims, 1 Drawing Sheet

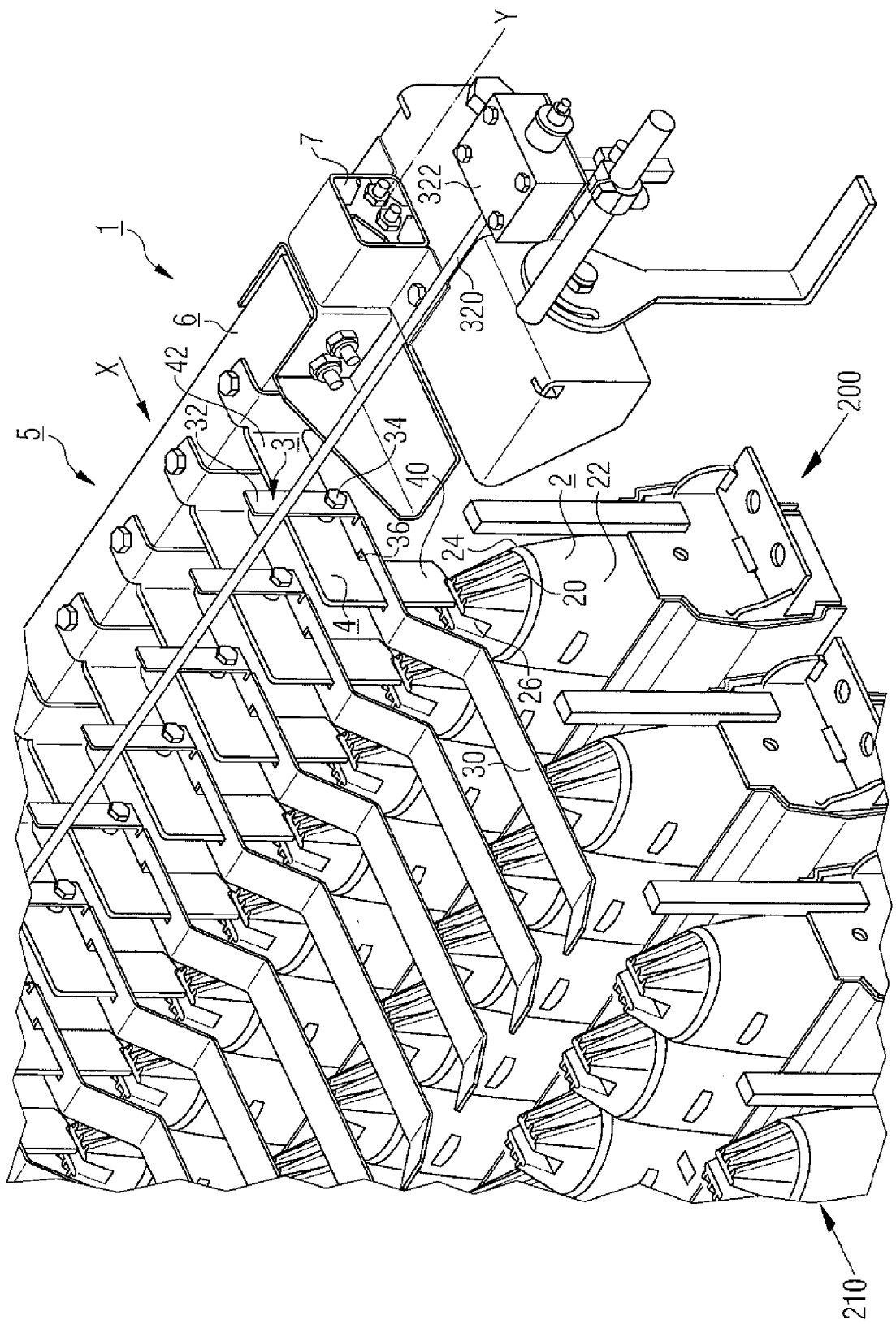

DEVICE FOR MONITORING THE EMPTY CONDITION OF A CONTAINER CELL OF A CONTAINER CLEANING MACHINE

CROSS-REFERENCE TO RELATED APPLICATION

This application claims priority from German Patent Application No. DE 10 2013 106 935.5, filed on Jul. 2, 2013 in the German Patent and Trademark Office, the disclosure of which is incorporated herein by reference in its entirety.

FIELD OF THE INVENTION

The present invention relates to a device for monitoring the empty condition of a container cell of a container cleaning machine, and in particular to a container cleaning machine for cleaning returnable bottles in a beverage filling plant.

RELATED ART

Devices for cleaning containers, and preferably for cleaning returnable bottles in beverage filling plants, are well known. In such devices, the returnable bottles to be cleaned pass through different treatment stations in a container cleaning machine, in which they are emptied, flushed with spray jets, immersed, treated with cleaning agent such as for example a cleaning lye, and/or finally rinsed with clear water. Various different procedures for cleaning returnable bottles are thereby known.

In order to guide the containers to be cleaned, and in particular the returnable bottles, along their path through the container cleaning machine, it is known to insert the individual containers into so-called container cells, within which they can then be transported through the container cleaning machine. In a container cleaning machine, a plurality of container cells are usually disposed adjacent to each other, thereby forming rows of container cells oriented perpendicular to the direction of transport. A plurality of such rows are usually disposed one behind the other in the direction of transport, for example mounted on transport chains or transport belts, in order thereby to enable virtually continuous transportation of a stream of containers to be treated. Container cleaning machines which transport containers intermittently are also known. The container cells disposed one behind the other in the direction of transport thus form columns of container cells.

The individual container cells are each configured to accommodate a single container, and for this purpose are usually provided with container cell inserts adapted to the type of container that is to be treated. The container cell inserts are usually formed from a plastic material, and ensure that the containers that are inserted for cleaning have only a predetermined clearance within each container cell. The container cells additionally ensure a defined orientation of the container openings such that, for example, the containers can be flushed by means of spray nozzles that are suitably aligned and/or subsequently brought into position.

The container cell inserts can be formed such that containers with differing dimensions can be conveyed securely through the container cleaning machine, and in particular a container can be oriented in its container cell such that its mouth area or opening is in a defined position.

The container cell inserts are usually pushed into the container cells, or container cell bodies, and clamped or locked in place there. The container cell inserts usually have a shape which allows the containers that will be cleaned to be pushed into each container cell with their mouths forward, and which then defines the limit of the depth to which each container can be inserted. In other words, without the container cell insert a container pushed into a container cell would be able to slide through the cell, or slide back out of it. Thus it is important, before the containers are pushed into the container cells, to check that each container cell is equipped with a container cell insert, in order to prevent subsequent collision between a container that may have slipped through and components of the container cleaning machine, and thereby to prevent interruptions to operation.

It is also known from the state of the art to check that each container cell is completely empty before a new container is pushed in, in order to avoid a disruption to operation occurring when a container is pushed into a container cell that already accommodates a container or a foreign body.

For this purpose, DE 29 02 596 C2 for example discloses a device for sensing empty cells, in which a feeler is introduced into the reception cells, and the machine is stopped if resistance is encountered.

From DE 195 24 350 A1, a device for determining the empty condition of reception cells for vessels in vessel cleaning machines is known, in which each bottle cell is checked by means of a light barrier to determine whether a bottle is still present or parts of a bottle are jammed inside.

A corresponding device for sensing empty cells is also known from DE 31 31 863 C2, in which the empty condition of cells is again determined using a feeler.

From DE 21 13 949, a device in container cleaning machines for removing foreign bodies from the mouth apertures of bottle cells is known, in which any containers or remains of containers that may be present are ejected by means of a piston that can be introduced into the bottle cell.

SUMMARY

Accordingly, embodiments of the present invention provide a new device and method for monitoring the empty condition of a container cell of a container cleaning machine, which enables even more reliable operation of a container cleaning machine.

In one embodiment, a device for monitoring the empty condition of a container cell of a container cleaning machine, such as a container cleaning machine for cleaning returnable bottles in a beverage filling plant, is proposed, comprising at least one foreign body ejection device for ejecting a foreign body that is present in a container cell from said container cell. According to one embodiment, a checking device for checking the integrity of the container cell is provided.

Because the device has not only a foreign body ejection device for ejecting from the container cell a container, or other foreign body, that is incorrectly present in the container cell, but also a checking device for checking the integrity of the container cell, it is possible to ensure at a single position on the machine that each container cell into which a container to be treated is subsequently to be pushed is suitable to receive a container for treatment, and that a disruption to operation is therefore unlikely to occur.

By this means it can be ensured that another container for treatment is not pushed into a container cell that is already occupied by a container or fragment that may be jammed within. This accordingly makes it possible to prevent collision between a container that is to be pushed into the container cell and a foreign body inside the container cell.

Furthermore, by checking the integrity of the container cell, and in particular by checking that a container cell insert is present, it is possible to ensure that a container to be pushed into the container cell will actually be retained in the container cell, and will not fall out of the container cell as it is conveyed onwards through the container cleaning machine.

In one embodiment, the checking device and the foreign body ejection device form a single assembly. In this manner, the space required within the container cleaning machine can be reduced, permitting a more compact design of the machine. In addition, the installation of the assembly comprising the foreign body ejection device and the checking device is simplified, since, when the cleaning machine is assembled or maintained, it is necessary to replace or install only this single assembly. This makes it possible to reduce downtime.

The checking device, in one embodiment, is attached to a bracket of the foreign body ejection device. In one embodiment, a pivot axle of the checking device is then disposed on the bracket of the foreign body ejection device. In this manner, a particularly compact size can be achieved, since both the foreign body ejection device and the checking device can be mounted in substantially the same position in the container cleaning machine.

The checking device and the foreign body ejection device, in one embodiment, are disposed one behind the other in the direction of transport of the container cell, wherein, in one embodiment, first the foreign body ejection device and then the checking device interacts with the container cell. In this manner it can be achieved that the integrity of each container cell is checked only after it has passed the foreign body ejection device, and possible damage to the container cell or a container cell insert caused by the foreign body ejection device itself can thus also be detected. It can for example occur that when a fragment is jammed tightly in a container cell insert, the foreign body ejection device tears the entire container cell insert out of the container cell. By disposing the feeler area of the checking device after the foreign body ejection device, such damage and the consequent lack of integrity of the container cell can be detected.

In one embodiment, the checking device has a feeler area for examining the container cell, such as for determining whether a container cell insert is present, and a triggering area for triggering a sensor. In one embodiment, the checking device is retained on the foreign body checking device such that it is pivotable about a pivot axis disposed between the feeler area and the triggering area. In this manner, certainty in the examination of the integrity of the container cell, and assurance that the foreign body ejecting device has ejected all foreign bodies from the container cell, can be combined favorably, such that efficient and sure monitoring of each container cell is achieved, without the device as a whole becoming too complex. It is in particular advantageous, in view of the conditions experienced by the component in the demanding atmosphere inside a container cleaning machine, for the design of both the checking device and the foreign body ejection device to be as resistant as possible to any corrosion.

Mechanically simple assemblies can also be achieved if the foreign body ejection device has an ejection area and a bracket, wherein the checking device is disposed on the bracket of the foreign body ejection device. In one embodiment, the foreign body ejection device has an ejection area and, rigidly connected thereto, a bracket, and the bracket is pre-tensioned in the direction of ejection.

In an additional advantageous further development, the assembly comprising the checking device and the foreign body ejection device is retained on a support beam extending transversely to the direction of transport of the container cell. A plurality of assemblies are disposed, in one embodiment, along the support beam, with one assembly for each container cell column, in order to enable monitoring of all columns of container cells.

In order to achieve a mechanically simple and reliable design of the assemblies, the support beam, in one embodiment, is pivotable about a pivot axis extending perpendicular to the direction of transport of the container cell, and is pre-tensioned in the direction of ejection of the foreign body ejection device. By this means, if the ejection area of one of the foreign body ejection devices disposed on the support beam jams, it is possible to avoid destruction of the container cell, the foreign body ejection device or other areas of the machine. This is because the ejection area can deviate against the pre-tension. In such a case, although the other container cells in this row of container cells are not examined, damage caused by the foreign body ejection device is avoided.

In one embodiment, a common sensor device is provided for at least two, and, in another embodiment, all of the checking devices that extend along the support beam. In this manner the entire row of container cells can be monitored efficiently using only a single sensor. This does not provide positionally precise monitoring. However, since the container cleaning machine as a whole is usually stopped if a container cell is found to lack integrity, in order for an operator to find the defective container cell immediately by means of a visual inspection, this is not necessarily to be regarded as a disadvantage, and the single sensor leads to a simple design of the device. In one embodiment, the sensor device can thereby be in the form of a light barrier, a mechanically deflectable sensor cable which operates a switch when deflected, and/or an electrically connectable sensor cable.

In one embodiment, a support beam extending transversely to the direction of transport is provided, to which a bracket of the foreign body ejection device is fixedly attached. Each foreign body ejection device can thereby pass through the container cells that are arranged adjacent to each other in the container cell rows, or else engage them with its ejection area such as to achieve the ejection of foreign bodies jammed in the container cells, and in particular of containers or fragments of containers jammed in the container cells. By means of its mounting on a common support beam, a particularly simple design of the foreign body ejection device can also be achieved, significantly less complex than the feelers or ejection pistons known from the state of the art, which must in each case be introduced separately into the individual container cells.

The support beam, in one embodiment, is rotatably disposed and pre-tensioned in the direction of ejection, so that the ejection area of the foreign body ejection device is pre-tensioned in the direction of ejection. If the resistance to an individual foreign body ejection device is too high, it can be deflected upwards, above and out of the way of the foreign body causing the resistance, without the container cell, the foreign body ejection device or the support beam suffering any damage.

The support beam, in one embodiment, is pre-tensioned in the direction of ejection by means of a spring or elastomer.

BRIEF DESCRIPTION OF THE DRAWINGS

Various embodiments and aspects of the present invention are more fully explained by the description below of the FIGURE.

FIG. 1 shows a schematic perspective representation of a device for cleaning containers.

DETAILED DESCRIPTION

Examples of embodiments are described below with the aid of the FIGURE. In the FIGURE, elements which are identical or similar, or have identical effects, are designated with identical reference signs, and repeated description of these elements is in part dispensed with in the description below, in order to avoid redundancy.

FIG. 1 is a schematic perspective representation of a device 1 for monitoring the empty condition of a container cell 2 of a container cleaning machine for cleaning returnable bottles (which are not shown in the FIGURE).

A plurality of container cells 2 are provided, which serve to accommodate the containers that are to be treated and/or cleaned. The container cells 2 each comprise a container cell insert 20, which is shown in FIG. 1 at the upper end of each container cell 2, and which enables the container pushed into each container cell 2 to be reliably conveyed. The container cell 2 is accordingly adapted by the container cell insert 20 to, for example, differing container dimensions, in particular to differing container heights and/or differing container diameters, such that a container to be treated which is accommodated in the container cell 2 assumes a substantially defined position within the container cell 2. In this manner it can be ensured that the mouth of a container to be treated is accommodated in a defined position within the container cell 2, such that, for example, a spray jet for flushing the container, which is directed towards the container mouth by means of a spray nozzle, or is subsequently brought to the container mouth, can enter the interior of the container through its mouth in a defined manner.

Because of the movement of the spray nozzle and container mouth relative to each other during the transport of the container to be treated through the container cleaning machine, it is advantageous to position the container mouth precisely relative to the container cell 2, in order to achieve assured and reliable flushing of the interior of the container. If the container mouth is not disposed in a defined position, for example because the container is not fully inserted, such flushing cannot be ensured due to the altered angular displacements, and/or a spray jet brought subsequently to the container mouth may even miss the it completely.

In the example embodiment shown, the container cell insert 20, which is a part of the container cell 2, is formed as a plastic insert, and is attached to a container cell body 22, for instance pushed partially into it. The container cell body 22, in one embodiment, is substantially manufactured from metal, for example steel or stainless steel, and has at its upper end an opening 24, which is then partially closed by the inserted container cell insert 20 such that a container to be treated that is pushed into the container cell 2 cannot slip from the container cell 2 and protrude from the opening 24, and cannot fall out of the container cell 2.

The container cell insert 20 is accordingly configured such that it enables a limit to be set to the depth to which a container for treatment is pushed into the container cell 2. When passing through a container cleaning machine, which is not shown here in full, for example a bottle rinsing machine for rinsing or cleaning returnable bottles in a beverage filling plant, it is also possible to convey the returnable bottles that are to be treated upside down, i.e. with their openings oriented downwards, in order that the fluid in the returnable bottles can flow out. In this position, the interiors of the returnable bottles can also be flushed with spray jets. The returnable bottles are prevented from slipping out of the container cells 2 during this inverted treatment due to the fact that the container cell insert 20 reduces the size of the opening 24 of the container cell body 22 to the extent that the container to be treated does not slip out, but instead is retained in a defined position.

As indicated in FIG. 1, the container cell insert 20 is additionally designed such that a slot-shaped treatment opening 26 is disposed in its front area, through which, for example, the mouth area of a container accommodated in the container cell 2 can be flushed with a spray jet.

A plurality of container cells 2 are accommodated adjacent to each other in container cell rows 200. The container cell rows 200 are oriented perpendicular to the direction of transport X. A plurality of container cell rows 200 are disposed one behind the other in the direction of transport X, so that columns of container cells 210 are also formed here.

By means of the arrangement of the container cells 2 in this manner, virtually continuous transportation of containers to be cleaned and/or treated through the container cleaning machine is made possible.

In order to ensure that the container cells 2 are intact before a new container to be treated is pushed into each container cell 2, a checking device 3 is provided, for checking the integrity of each container cell 2. The checking device 3 is in particular provided for checking that a container cell insert 20 is in fact present, or whether the container cell insert 20 is missing. This is because if the container cell insert 20 is missing, a container to be treated while inverted would either slide completely out of the container cell 2, or at least protrude too far into the treatment device, which would pose a risk that, for example, spray nozzles for flushing the container to be treated, or other machine components, would be damaged, displaced or even broken off. Accordingly, checking the integrity of the container cells 2 is an important measure for ensuring the reliability of operation of the device for cleaning containers 1.

For this purpose, the checking device 3 has a feeler area 30, which is pivotably retained and which slides under its own weight across the container cells 2, and in particular across the container cell inserts 20. Thus in the event that, for example, a container cell insert 20 were missing, the feeler area 30 would no longer be supported by a container cell insert 20 below, and would instead pivot downwards. When this pivoting downwards occurs, a triggering area 32 connected with the feeler area 30 is moved. In the example embodiment shown, the triggering area 32 is disposed substantially at a right angle to the feeler area 30. The pivot axle 34, around which the feeler area 30 is pivotable, is disposed in the example embodiment shown between the feeler area 30 and the triggering area 32. Thus when the feeler area 30 pivots downwards in the example embodiment shown, the triggering area 32 correspondingly moves forward in the direction of transport of the container cells 2. When the triggering area 32 moves forward, it strikes a sensor cable 320 and deflects it, and by this means a sensor 322, for example in the form of a microswitch, is operated.

In another embodiment, instead of or in addition to the deflection of the sensor cable 320 by the triggering area 32 of the checking device 3, an electrical circuit can be closed. To achieve this, for example, the checking devices 3 with their triggering areas 32 are connected to a first potential and the sensor cable 320, which in this case is conductive, is connected to a second potential. When the sensor cable 320 is touched by the triggering device 32, a contact is thereby established which can be detected for example by the flow of a current.

In place of the sensor cable 320, it is also possible to use, for example, a light barrier, which is interrupted by the pivoting of the triggering device 32 when a container cell insert 20 is missing and the feeler area 30 correspondingly pivots downwards. This is another means by which a sensor signal can be generated.

As well as the checking device 3, a foreign body ejection device 4 is also provided in the device 1, by means of which foreign bodies that are present in a container cell 2 can be ejected from the container cell 2. To achieve this, the foreign body ejection device 4 has an ejection area 40, which protrudes into the treatment opening 26 of the container cell insert 20 and acts upon foreign bodies in this area such as to eject them. In particular, the ejection area 40 of the foreign body ejection device 4 thereby serves to drive any containers that may be jammed, and still in a container cell 2, out of this container cell 2, for example by applying a force to the applicable container mouth.

In addition, the foreign body ejection device 4 serves to drive out of the container cell 2 any fragments or broken-off mouth sections, for example from broken returnable bottles, that may be jammed or stuck in the container cell 2, and in particular in the area of the container cell insert 20. For this purpose the ejection area 40 of the foreign body ejection device 4 is beveled towards the direction of transport X such that when the container cell inserts 20 are transported past, a corresponding wedge effect is applied to foreign bodies that may potentially be in the container cell inserts 20.

In this manner the reliability of operation of the device as a whole can be increased, due to a reduction of the risk that a new container to be treated will be pushed into a container cell 2 despite the presence of another container or other foreign body in the container cell 2. Correspondingly, disruptions of the machine, such as for example breakage of a container, can be avoided, and by this means too the operational safety and/or reliability of the container cleaning can be increased.

The foreign body ejection device 4 and the checking device 3 are combined in a common assembly 5. As well as its ejection area 40, the foreign body ejection device 4 has a bracket 42, by means of which the ejection area 40 of the foreign body ejection device 4 is retained on a support beam 6 of the device 1. The bracket 42 of the foreign body ejection device 4 serves at the same time to retain the pivot axle 34 of the checking device 3.

Accordingly, it is possible by means of the checking device 3 to check, in a simple and reliable manner, whether the container cells 2 have integrity, or whether for example the container cell insert 20 is missing. If such absence of a container cell insert 20 is detected, either the container cleaning machine as a whole is halted, or else the applicable container cell row 200 in its entirety is not loaded with new containers to be cleaned, and this container cell row 200 is thereby excluded. In the example embodiment shown, only a single sensor—in the form of the sensor cable 320 in combination with the sensor switch 322, or, if a light barrier is used, in the form of a light barrier signal—serves to detect lack of integrity for all checking devices 3. Because of this, it is not possible to determine the precise position (i.e. the precise column), and exactly which of the container cells 2 in a container cell column 200 lacks integrity. It is possible to determine only in which container cell row 200 at least one container cell 2 lacks integrity, with the result that the loading of an entire row 200 of container cells is canceled.

In another example embodiment, which is however not shown in FIG. 1, each individual checking device 3 has its own sensor, so that it is possible to detect precisely from which container cell a container cell insert 20 is missing. In this case, mechanical, optical and/or magnetic sensors may be used.

The foreign body ejection device 4 is substantially fixedly retained by means of its bracket 42 on the support beam 6. This also results in a stable and defined connection for the pivotable checking device 3 on the foreign body ejection device 4. In this manner it becomes possible to achieve a particularly compact design of the two functional units, namely the checking device 3 and the foreign body ejection device 4.

In order to achieve a particularly compact design in the example embodiment shown, a slot 36 is provided in the feeler area 30 of the checking device 3, through which the ejection area 40 of the foreign body ejection device 4 extends in a downward direction. The foreign body ejection device 4 with its ejection area 40 and the feeler area 30 are thereby symmetrically disposed with respect to each other, and are oriented to cover precisely the center line of each container cell 2. The dimensions of the slot 36 are such that the checking device 3 can pivot without problems.

In the event that a particularly stubborn foreign body were present in the container cell 2, a completely rigid mounting of the ejection area 40 of the foreign body ejection device 4 would lead to the foreign body, and hence the container cell 2, sticking to the foreign body ejection device 4, which would damage either the transport device with the container cells 2 or the foreign body ejection device 4. In order to avoid damage, the support beam 6 is retained such that it can rotate about its axis of rotation Y, and is pre-tensioned by means of an elastomer 7 in the direction in which the ejection area 40 ejects. In place of the elastomer 7, it is also possible to provide a spring or other pre-tensioning device, which pre-tensions the support beam 6 such that the foreign body ejection device 4 is pre-tensioned in the direction of ejection. By this means if a particularly stubborn foreign body is present in the container cell insert 20, the ejection area 40, which is connected via the bracket 42 with the support beam 6, can be deflected upwards due to the ability of the support beam 6 to rotate, so that neither the container cell insert 20 nor other parts of the device are damaged. In case this occurs, however, it is possible to provide a sensor (not shown here) which detects such a deflection of the support beam 6 and, in this case too, forces the container cleaning machine to stop in order that an immediate examination of the container cell row 200 can be performed.

To the extent applicable, all individual features described in the individual example embodiments can be combined with each other and/or exchanged, without departing from the field of the invention.

What is claimed is:

1. A system for processing containers comprising:
a first plurality of container cells arranged in a first row;
a second plurality of container cells arranged in a second row behind the first row, wherein the first row and the second row are perpendicular to a direction of movement of the container cells during processing;
a checking device comprising a pivotable feeler arm that moves downward when a container cell insert overlying a corresponding one of the container cells in the first row is absent; and
an ejection device comprising a protrusion extending into a treatment opening of a container cell insert.

2. The device of claim 1, wherein the ejection device and the checking device form a single assembly.

3. The device of claim 1, wherein the checking device is attached to a bracket of the ejection device.

4. The device of claim 3, wherein the bracket is approximately perpendicular to the protrusion.

5. The device of claim 4, wherein the bracket and the protrusion form a unitary structure.

6. The device of claim 1, wherein the checking device is pivotably connected to the ejection device.

7. The device of claim 3, further comprising a pivot axle attached to the checking device and engaged through an opening in the bracket.

8. The device of claim 1, wherein the protrusion is located behind the pivotable feeler arm in the direction of movement.

9. The device of claim 1, wherein the checking device further comprises a triggering area that moves forward when the pivotable feeler arm moves downward.

10. The device of claim 9, wherein triggering area triggers a sensor when a container cell insert is detected as being absent from an associated container cell.

11. The device of claim 1, wherein the protrusion extends through a slot of the checking device.

12. The device of claim 3, wherein the bracket is pretensioned in a direction of ejection of material from the container cell inserts.

13. The device of claim 1, further comprising a support beam extending along a direction of the first and second rows and coupled to the ejection device.

14. The device of claim 13, wherein the support beam is coupled directly to the ejection device and indirectly to the checking device.

15. The device of claim 1, further comprising a sensor device associated with at least two of columns of the container cells.

16. The device of claim 15, wherein the sensor device comprises a cable or a light barrier.

17. A method for processing containers comprising:
moving a first row of container cells past an ejection device;
moving, subsequently, the first row of container cells past a checking device, wherein a feeler portion of the checking device travels downward in the absence of a container cell insert for a container cell; and
moving a second row of container cells behind the first row of container cells past the ejection device.

18. The method of claim 17, wherein the downward travel triggers a sensor device.

19. The method of claim 17, wherein moving the first row of container cells past the ejection device comprises moving a protrusion of the ejection device along a treatment opening of a container cell insert.

* * * * *